United States Patent
Chen et al.

(10) Patent No.: US 11,291,930 B2
(45) Date of Patent: Apr. 5, 2022

(54) RESERVE TANK FOR LIQUID COOLING SYSTEM

(71) Applicant: Cooler Master Co., Ltd., New Taipei (TW)

(72) Inventors: Hsin-Hung Chen, New Taipei (TW); Geeng Jieh Chong, New Taipei (TW)

(73) Assignee: Cooler Master Co., Ltd., New Taipei (TW)

( * ) Notice: Subject to any disclaimer, the term of this patent is extended or adjusted under 35 U.S.C. 154(b) by 845 days.

(21) Appl. No.: 16/125,877

(22) Filed: Sep. 10, 2018

(65) Prior Publication Data
US 2019/0083906 A1    Mar. 21, 2019

Related U.S. Application Data

(60) Provisional application No. 62/559,959, filed on Sep. 18, 2017.

(51) Int. Cl.
*B01D 19/00* (2006.01)

(52) U.S. Cl.
CPC ..... *B01D 19/0042* (2013.01); *B01D 19/0031* (2013.01)

(58) Field of Classification Search
None
See application file for complete search history.

(56) References Cited

U.S. PATENT DOCUMENTS

| | | | | |
|---|---|---|---|---|
| 5,674,199 A * | 10/1997 | Brugger | ............... | A61M 1/3627 422/44 |
| 5,849,065 A * | 12/1998 | Wojke | ................. | A61M 1/3627 96/211 |
| 6,117,342 A * | 9/2000 | Schnell | ............. | B01D 19/0031 210/188 |
| 6,179,904 B1 * | 1/2001 | Knowles | ................ | B01D 45/06 55/337 |
| 7,279,031 B1 * | 10/2007 | Wright | ................ | A61M 1/3627 604/126 |
| 9,764,256 B2 * | 9/2017 | Cnossen | ............ | B01D 19/0042 |
| 10,040,001 B2 | 8/2018 | Lu | | |
| 2005/0081716 A1 * | 4/2005 | Morita | ............... | B01D 19/0042 95/241 |
| 2009/0084267 A1 * | 4/2009 | Furey | ................. | B01D 19/0042 96/194 |
| 2017/0056788 A1 * | 3/2017 | Liu | ...................... | B01D 15/166 |

* cited by examiner

*Primary Examiner* — Christopher P Jones
*Assistant Examiner* — Phillip Y Shao
(74) *Attorney, Agent, or Firm* — Alan D. Kamrath; Karin L. Williams; Mayer & Williams PC

(57) ABSTRACT

A reserve tank has a container, an outlet component, and an inlet component. The outlet component and the inlet component are mounted on the container. The outlet component has an open end located at a center of the container. The inlet component has a branch portion mounted in the container and an inlet channel in the branch portion. Therefore, when the reserve tank is disposed obliquely, even though the reserve tank is not full of a working liquid and contains some gas, the gas can hardly flow into the open end of the outlet component. In addition, if some gas enters the container through the inlet channel and thus forms bubbles, the bubbles may move upward along part of the branch tunnels extending upward, so the entering bubbles are still far from the open end.

20 Claims, 17 Drawing Sheets

RESERVE TANK FOR LIQUID COOLING SYSTEM

CROSS-REFERENCE TO RELATED APPLICATIONS

This application is based upon and claims priority under 35 U.S.C. 119 from U.S. patent application filed on Sep. 18, 2017 and having application Ser. No. 62/559,959, the entire contents of which are hereby incorporated herein by reference.

BACKGROUND OF THE INVENTION

1. Field of the Invention

The present invention relates to a liquid cooling system, especially to a reserve tank for a liquid cooling system.

2. Description of the Prior Arts

It is commonly known that many devices will generate heat during operation, such as high frequency central processing units, graphics processing units, vehicle LED lights, projectors, etc. Besides, high temperature may not only decrease the efficiencies of those devices, but worse even damage them. Therefore, those devices are equipped with heat sinks such as fins or fans, and devices generating extremely large amount of heat are equipped with a liquid cooling system.

A liquid cooling system comprises a pump, a reserve tank, a heat exchanger (i.e. heater core or radiator), a water block, and circling pipes connecting aforesaid elements. The reserve tank contains working liquid therein. Even though the reserve tank is filled with the working liquid, the working liquid may evaporate as time elapses, such that the reserve tank is not full of the working liquid but contains some gas. If the gas enters the circulation of the working liquid, the pump may be damaged, and the heat sink efficiency may be reduced. Therefore, the liquid cooling system should prevent the gas from entering the circulation.

A widely used way to prevent the gas from entering the circulation is arranging an outlet of the reserve tank at a lower portion of the reserve tank. However, some devices (such as projectors) are not disposed upright when in use, so the predetermined lower portion of the reserve tank is no longer an actual lower portion of the reserve tank, and even may become a higher portion of the reserve tank. In the most extreme case, if the device equipped with the conventional liquid cooling system is inverted, the reserve tank of the conventional liquid cooling system is inverted as well, such that the outlet is on the top of the reserved tank and draws the gas rather than the working liquid.

To overcome the shortcomings, the present invention provides a reserve tank to mitigate or obviate the aforementioned problems.

SUMMARY OF THE INVENTION

The main objective of the present invention is to provide a reserve tank that may not allow gas to enter a connected pump no matter at what angle the reserve tank is disposed.

The reserve tank has a container, an outlet component, and an inlet component. The container forms two openings and an inner space for containing a working liquid. The outlet component is mounted through one of the two openings of the container. The outlet component comprises an outlet fixing portion, an extending portion, an outlet connecting portion, and an outlet channel. The outlet fixing portion is mounted in said one of the two openings. The extending portion is located in the container and comprises a fixing end and an open end. The fixing end of the extending portion is mounted on one side of the outlet fixing portion. The open end of the extending portion is located at a center of the container. The outlet connecting portion is mounted on another side of the outlet fixing portion and is located out of the container. The outlet channel is formed through the outlet fixing portion, the extending portion, and the outlet connecting portion, and communicates with the inner space of the container. The inlet component is mounted through the other one of the two openings of the container. The inlet component comprises an inlet fixing portion, a branch portion, an inlet connecting portion, and an inlet channel. The inlet fixing portion is mounted on said the other one of the two openings. The branch portion is mounted on one side of the inlet fixing portion and is located in the container. The inlet connecting portion is mounted on another side of the inlet fixing portion and is located out of the container. The inlet channel comprises a main tunnel and a plurality of branch tunnels. The main tunnel is formed through the inlet connecting portion and the inlet fixing portion, and in the branch portion. The branch tunnels are formed in the branch portion. One end of each one of the branch tunnels is connected to and communicates with the main tunnel another end of each one of the branch tunnels communicates with the inner space of the container, and the branch tunnels extend outward from the main tunnel and is arranged radially.

With the aforesaid structures, i.e. the outlet component has the extending portion and the extending portion has the open end located at the center of the container, when the reserve tank is disposed obliquely, even though the reserve tank is not full of the working liquid and contains some gas, the gas may hardly flow into the open end of the outlet component. Therefore, the gas may not flow to the connected pump. In addition, with the inlet component having the branch portion and the inlet channel having the branch tunnels formed in the branch portion, if some gas enters the container through the inlet channel and thus forms bubbles, the bubbles may move upward along part of the branch tunnels which extend upward, so the entering bubbles are still far from the open end. Therefore, the bubbles may not be drawn in the outlet channel no matter at what angle the reserve tank is disposed.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
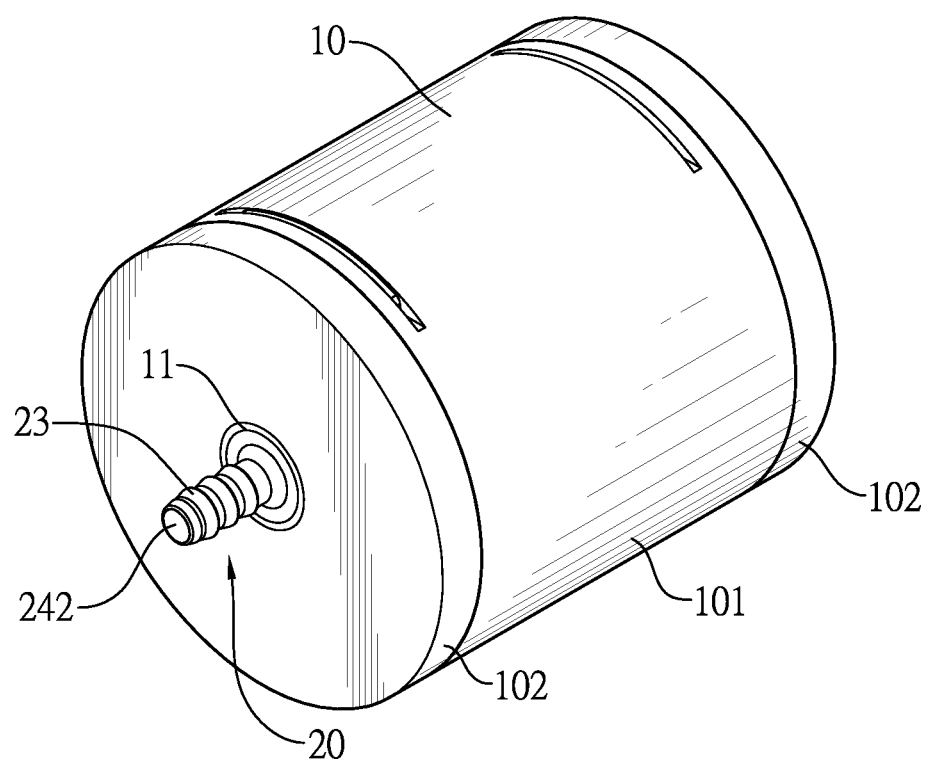
FIG. 1 is a perspective view of a reserve tank in accordance with a first embodiment of the present invention.
Figure 2:
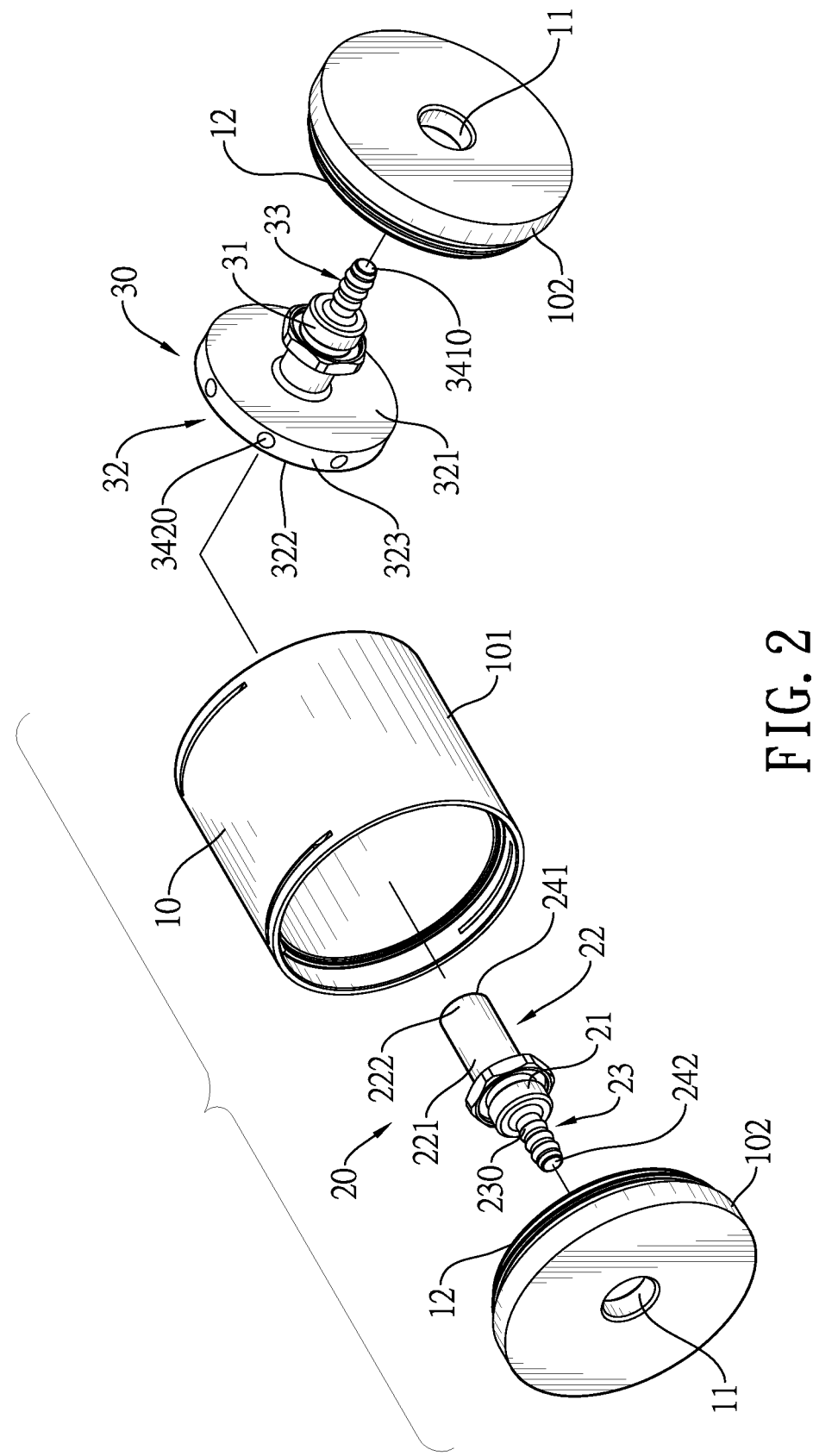
FIG. 2 is an exploded perspective view of the reserve tank in FIG. 1.
Figure 3:
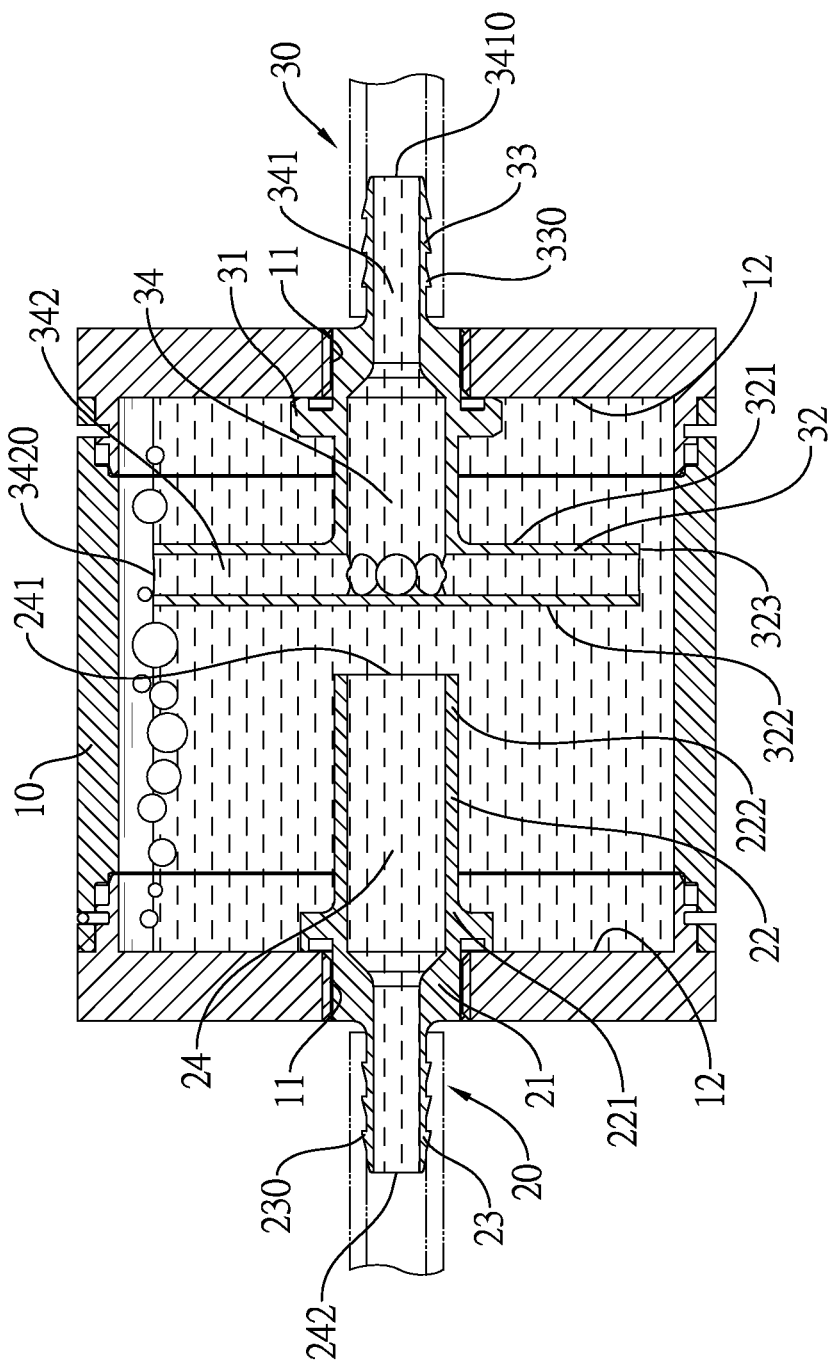
FIG. 3 is a sectional view of the reserve tank in FIG. 1.

With reference to FIGS. 1 to 3, a reserve tank for a liquid cooling system in accordance with a first embodiment of the present invention is provided with a container 10, an outlet component 20, and an inlet component 30.

The container 10 is used for accommodating a working liquid circulating in the liquid cooling system. The container 10 has a main body 101 and two lids 102 and forms an inner space and two openings 11. The main body 101 is hollow and the two lids 102 close two ends of the main body 101, respectively. Each one of the two lids 102 forms a respective plain surface 12 thereon. The inner space is formed in the main body 101 and between the two lids 102. The two openings 11 communicate with the inner space and may be formed through two opposite surfaces, two adjacent surfaces, or the same surface of the container 10. In this embodiment, the two openings 11 are respectively formed on the two lids 102. The container 10 is a cylinder, but it is not limited thereto. The two openings 11 are arranged on and formed through the two opposite plain surfaces 12 of the lids 102.

The outlet component 20 and the inlet component 30 are mounted through the two openings of the container 10.

The outlet component 20 extends along an axis of the container 10 and comprises an outlet fixing portion 21, an extending portion 22, an outlet connecting portion 23, and an outlet channel 24.

The outlet fixing portion 21 of the outlet component 20 is mounted in one of the openings 11 of the container 10. The extending portion 22 and the outlet connecting portion 23 are formed on two opposite sides of the outlet fixing portion 21 of the outlet component 20. In other words, the extending portion 22 and the outlet connecting portion 23 are two ends of the outlet component 20. Furthermore, the extending portion 22 is located in the container 10 and the outlet connecting portion 23 is located out of the container 10.

The extending portion 22 comprises a fixing end 221 and an open end 222. The fixing end 221 is securely fixed on the outlet fixing portion 21 of the outlet component 20, and the open end 222 is located at a center of the container 10. Precisely, the open end 222 is located at a radial or widthwise center of the container 10, and is at or adjacent to an axial center of the container 10, but it is not limited thereto.

The outlet connecting portion 23 is used for connecting with a pipe of the liquid cooling system. The outlet connecting portion 23 comprises at least one rib 230. The at least one rib 230 is formed on an outer surface of the outlet connecting portion 23. In this embodiment, the at least one rib 230 may be a plurality of annular ribs 230. In another embodiment, the at least one rib 230 may be one spiral rib.

The outlet channel 24 is formed through the outlet fixing portion 21, the extending portion 22, and the outlet connecting portion 23, especially, through the fixing end 221 and the open end 222 of the extending portion 22. The outlet channel 24 comprises an exhaust opening 241 and an outlet opening 242. The exhaust opening 241 is formed at the open end 222 of the extending portion 22. Therefore, even though the container 10 is not full of the working liquid and accommodates some gas, the exhaust opening 241 at the open end 222 may not be exposed to the gas and may not draw the gas because the gas is always on a top portion of the inner space. The outlet opening 242 is formed on an outer end surface of the outlet connecting portion 23.

The inlet component 30 comprises an inlet fixing portion 31, a branch portion 32, an inlet connecting portion 33, and an inlet channel 34. The inlet fixing portion 31 of the inlet component 30 is mounted in the other one of the openings 11 of the container 10. The branch portion 32 and the inlet connecting portion 33 are formed on two opposite sides of the inlet fixing portion 31 of the inlet component 30. In other words, the branch portion 32 and the inlet connecting portion 33 are two ends of the inlet component 30. Furthermore, the branch portion 32 is located in the container 10 and the inlet connecting portion 33 is located out of the container 10.

The branch portion 32 extends adjacent to and parallel to one of the plain surfaces 12 of the container 10. In this embodiment, the branch portion 32 comprises a round disk body, and the inlet fixing portion 31 of the inlet component 30 is fixed at a center of the round disk body. The disk body comprises a first surface 321, a second surface 322, and a side surface 323. The first surface 321 and the second surface 322 are round surfaces, are opposite each other, and are parallel to the plain surfaces 12 of the container 10. The first surface 321 is near and faces the plain surface 12 of the container 10 on which the inlet component 30 is mounted. The second face 322 faces the outlet component 20. The side surface 323 of the branch portion 32 is between the first surface 321 and the second surface 322 near an inner side surface of the container 10.

The inlet connecting portion 33 is used for connecting with another pipe of the liquid cooling system. The inlet connecting portion 33 comprises at least one rib 330. The at least one rib 330 is formed on an outer surface of the inlet connecting portion 33. In this embodiment, the at least one rib 330 may be a plurality of annular ribs 330. In another embodiment, the at least one rib 330 may be one spiral rib.

The inlet channel 34 comprises a main tunnel 341 and a plurality of branch tunnels 342. One end of each one of the branch tunnels 342 is connected to and communicates with the main tunnel 341, and another end of the branch tunnel 342 is connected to and communicates with the inner space of the container 10. In other words, the branch tunnels 342 are arranged radially and the main tunnel 341 is connected to a radial center of the branch tunnels 342.

In this embodiment, the main tunnel 341 is formed through the inlet connecting portion 33 and the inlet fixing portion 31 and in the branch portion 32. The main tunnel 341 comprises an inlet opening 3410, and the inlet opening 3410 is formed on an outer end surface of the inlet connecting portion 33. In other words, the inlet opening 3410 is formed at an outer end of the main tunnel 341. Further, in this embodiment, the branch tunnels 342 are formed in the branch portion 32 and each one of the branch tunnels 342 comprises a branch opening 3420. The branch opening 3420 of each branch tunnel 342 is formed at an outer end of the branch tunnel 342. In other words, the branch opening 3420 is formed on the side surface 323 of the branch portion 32.

Figure 4:
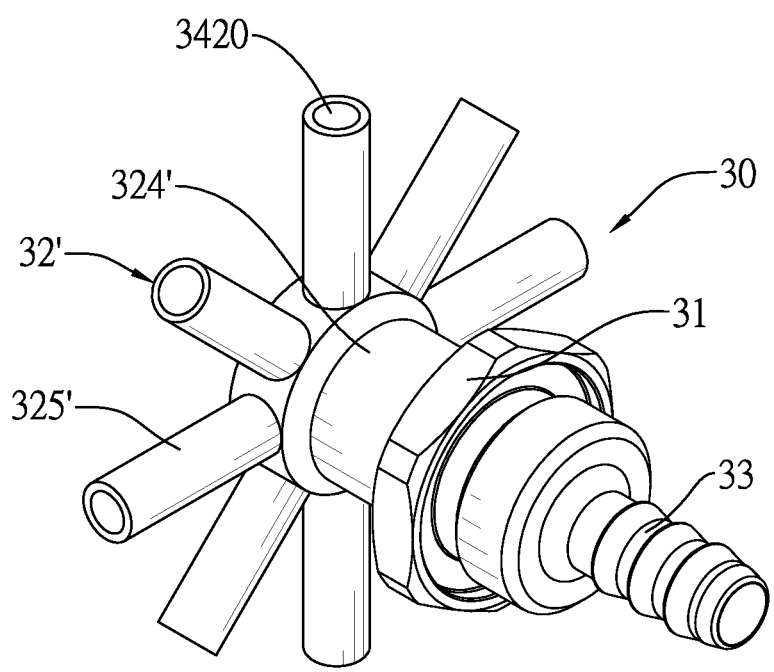
FIG. 4 is a sectional view in accordance with another configuration of an inlet component in FIG. 1.

Please refer to FIGS. 3 and 4. In another embodiment, the branch portion 32' does not comprise the round disk body but comprises a trunk 324' and a plurality of branches 325', so that the branch opening 3420 of each branch tunnel 342 is formed on an outer end of one of the branches 325'. Precisely, the trunk 324' is mounted on the inlet connecting portion 33, one end of each one of the branches 325' is mounted on the trunk 324', and thus the branches 325' are arranged radially and extend outward from the trunk 324'. The main tunnel 341 is further formed through the trunk 324', and the branch tunnels 342 are formed through the branches 325' respectively.

Please refer to FIGS. 1 to 3 again. Thus, in the circulation, the working liquid flows into the inlet component 30 through the inlet opening 3410, passes through the main tunnel 341 in the inlet connecting portion 33 and the inlet fixing portion 31 of the inlet component 30, and then is distributed into the branch tunnels 342 in the branch portion 32. After all, the working liquid flows out of the branch openings 3420 of the branch tunnels 342 and enters the inner space of the container 10.

On the other hand, the working liquid leaves the container 10 by entering the exhaust opening 241 and passing through the outlet channel 24 in the outlet component 20, and then discharging through the outlet opening 242 on the outlet connecting portion 23 of the outlet component 20.

In addition, with the reserve tank accommodating the working liquid, a capacity of the whole liquid cooling system is increased and the liquid cooling system can operate longer before all the working liquid evaporates. Besides, if the working liquid is water and the temperature is lower than a freezing point of the working liquid, i.e. the temperature is lower than zero degree Celsius, a volume of the water may increase significantly. With the reserve tank, the additional volume of the working liquid can be accommodated in the reserve tank, and thereby the liquid cooling system can be utilized longer.

Figure 5:
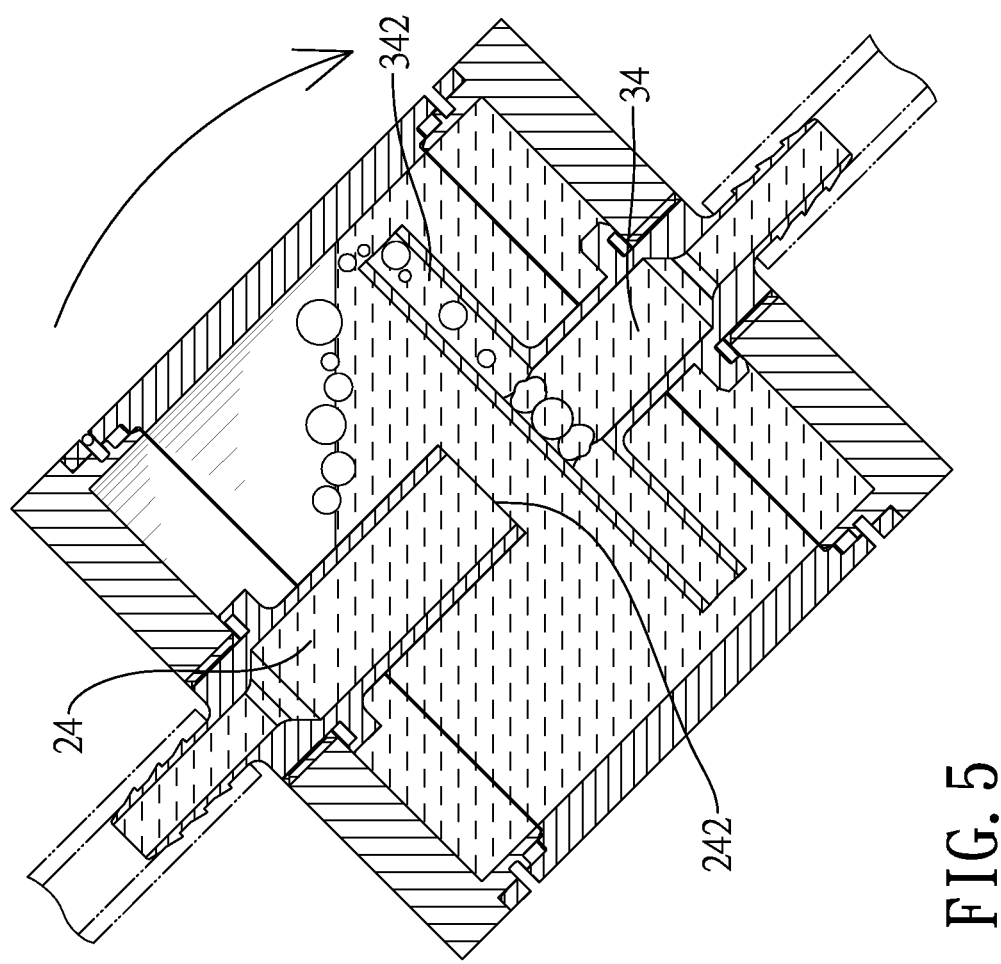
FIG. 5 is a sectional view of the reserve tank in FIG. 1 after tilted.
Figure 6:
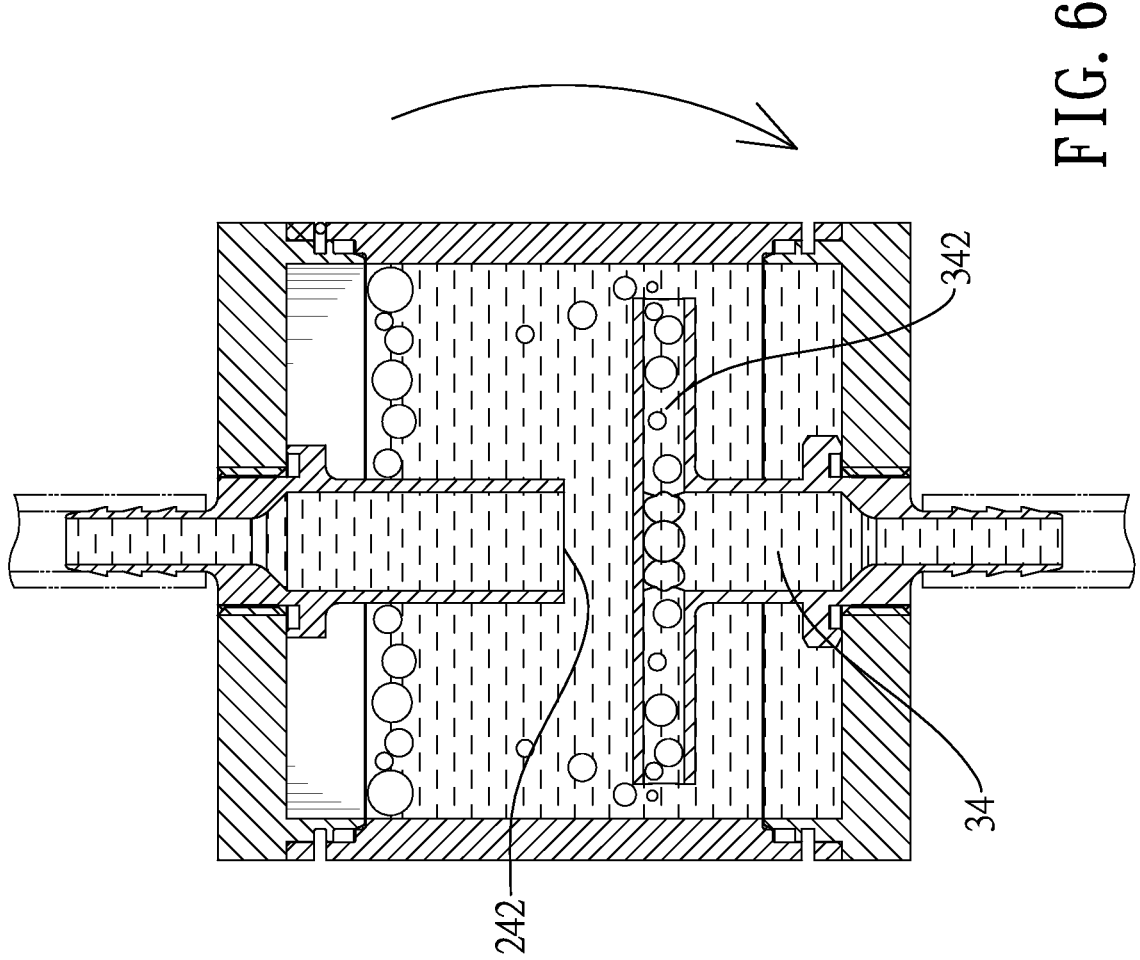
FIG. 6 is a sectional view of the reserve tank in FIG. 1 after further tilted.

With the aforesaid structures, according to FIGS. 3, 5, and 6, when the reserve tank of the present invention is arranged obliquely, even though the reserve tank is not full of the working liquid and contains some gas, the exhaust opening 241 of the outlet channel 24 on the open end 222 of the extending portion 22 is far from the gas and may not draw in the gas. Besides, if some gas enters the container 10 through the inlet channel 34 and forms bubbles, the bubbles move upward along part of the branch tunnels 342 extending upward, so the entering bubbles are still far from the exhaust opening 241. Therefore, the bubbles may not be drawn in the outlet channel 24 no matter at what angle the reserve tank is disposed.

Figure 7:
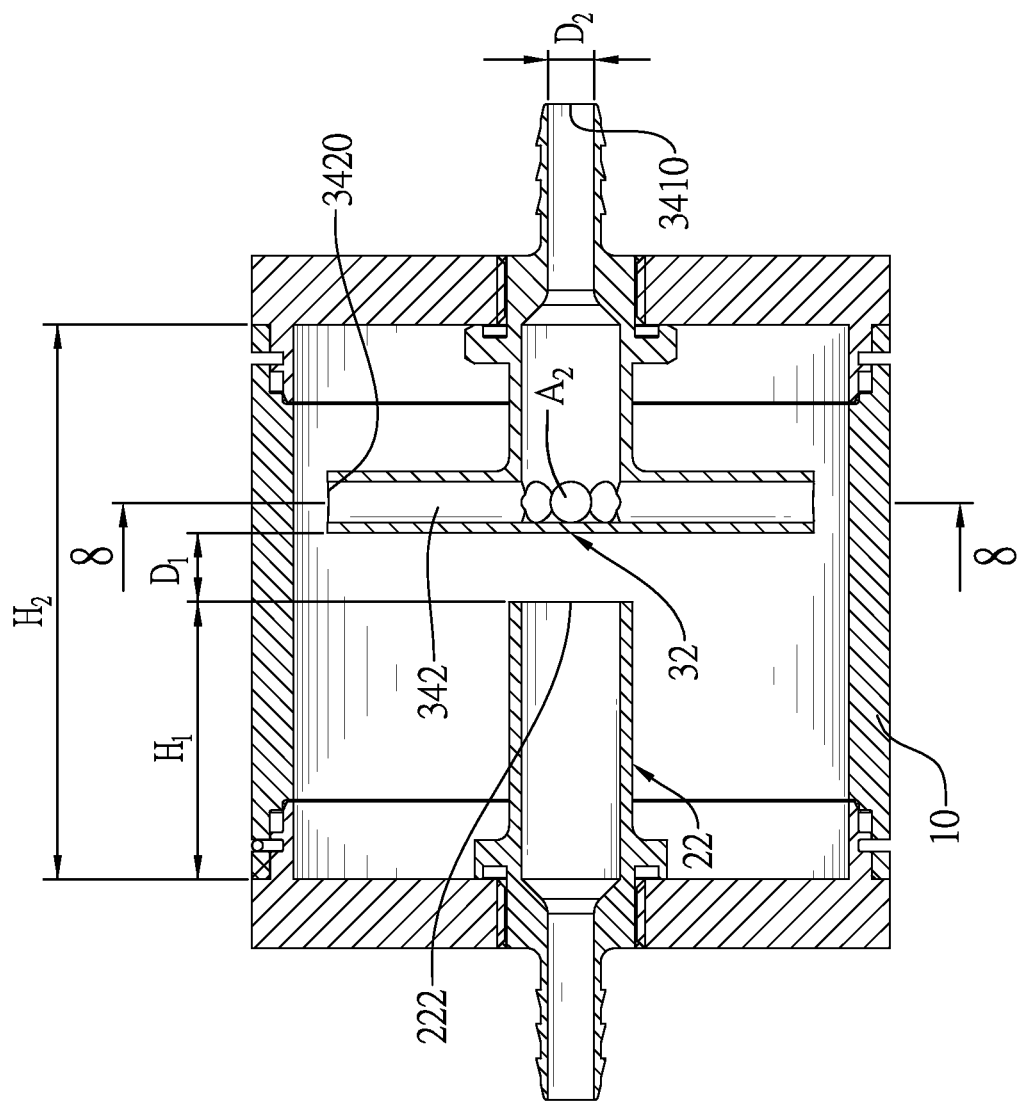
FIG. 7 is another sectional view of the reserve tank in FIG. 1.
Figure 8:
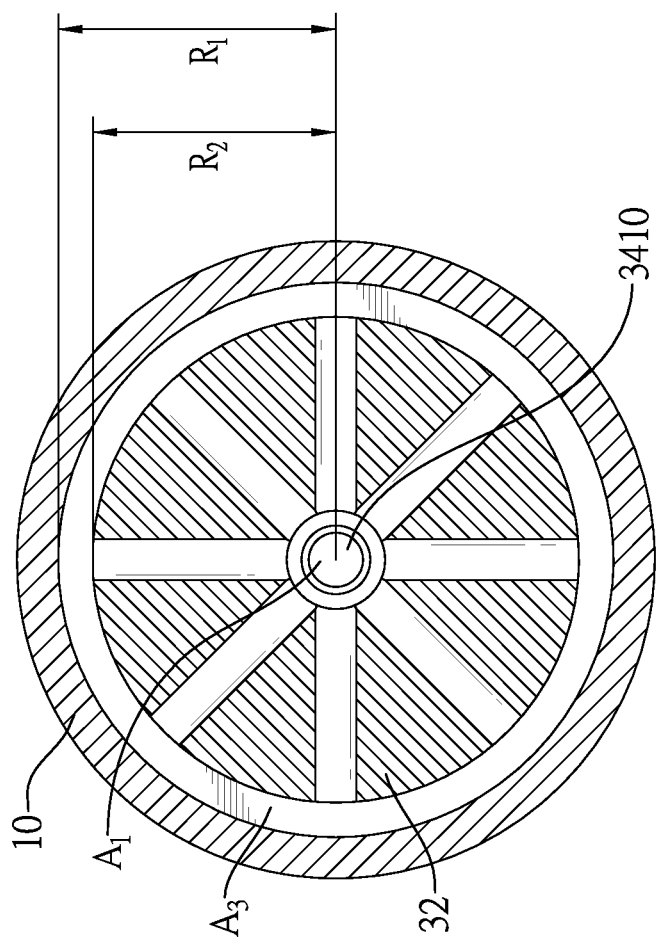
FIG. 8 is another sectional view of the reserve tank across line 8-8 in FIG. 7.

Please refer to FIGS. 3, 7, and 8. To reduce resistances of the circulation of the working liquid, sizes of the container 10, the inlet component 30, and the outlet component 20 are restricted. If an area of the inlet opening 3410 is $A_1$, an area of the branch opening 3420 of each branch portion 32 is $A_2$, a number of the branch tunnels 342 is N, and $A_2$ multiplied by N should not be less than $A_1$ (i.e. $A_2*N \geq A_1$).

In another embodiment, the areas of the branch openings 3420 may be different, and thus the summation of the areas of all the branch openings 3420 should not be less than $A_1$. In another embodiment that has a plurality of inlet openings 3410 at an outer end of the inlet connecting portion 33, $A_1$ is a summation area of all of the inlet openings 3410.

Besides, a projected area (which is projected on an imaginary plane that is perpendicular to the axis of the container 10) is defined between the inner side surface of the container 10 and the branch portion 32. An area of said projected area is $A_3$, and $A_3$ should not be less than $A_1$ (i.e. $A_3 \geq A_1$). Precisely, an inner radius of the container 10 is $R_1$, an outer radius of the branch portion 32 is $R_2$, and thus the projected area, $A_3$, is equal to $\pi R1^2 - \pi R2^2$ (i.e. $A3 = \pi R1^2 - \pi R2^2$).

In addition, to keep the open end 222 located at the center of the container 10, a length, $H_1$, of the extending portion 22 of the outlet component 20 is half a length, $H_2$, of the inner space of the container 10 (i.e. $H_1 = 0.5*H_2$). However, to reduce the resistances, a distance, $D_1$, between the open end 222 of the extending portion 22 and the second surface 322 of the branch portion 32 of the inlet component 30 should be greater than a diameter, $D_2$, of the inlet opening 3410 of the main tunnel 341 (i.e. $D_1 \geq D_2$).

Figure 9:
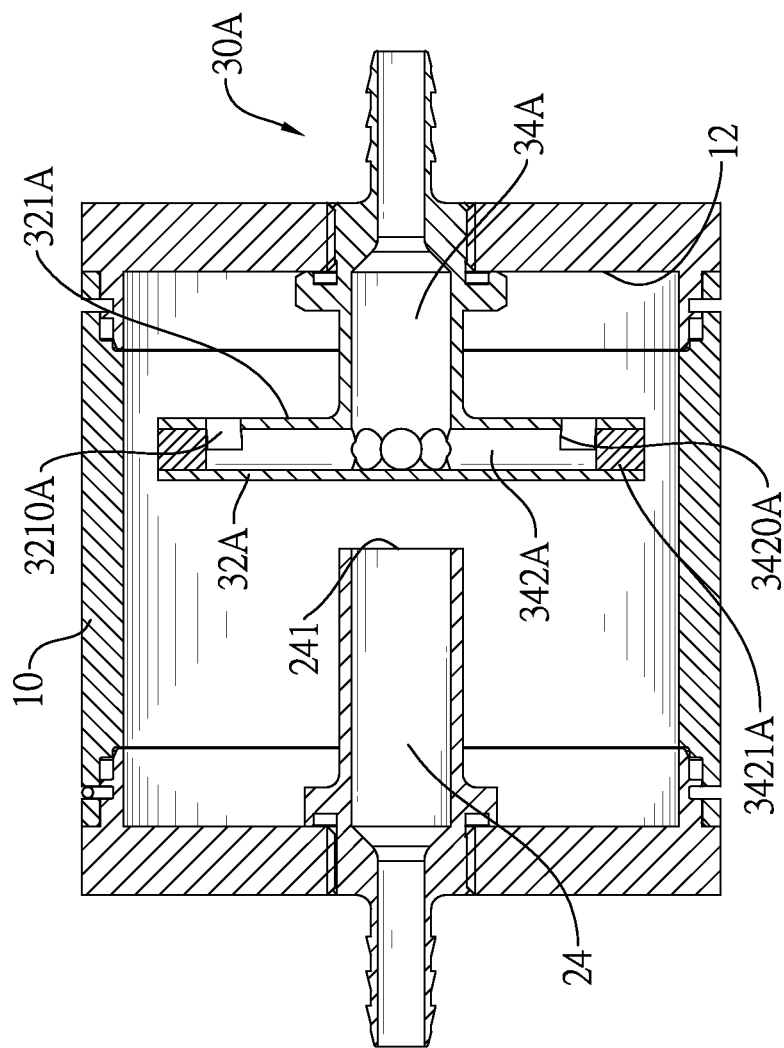
FIG. 9 is a sectional view of the reserve tank in accordance with a second embodiment of the present invention.
Figure 10:
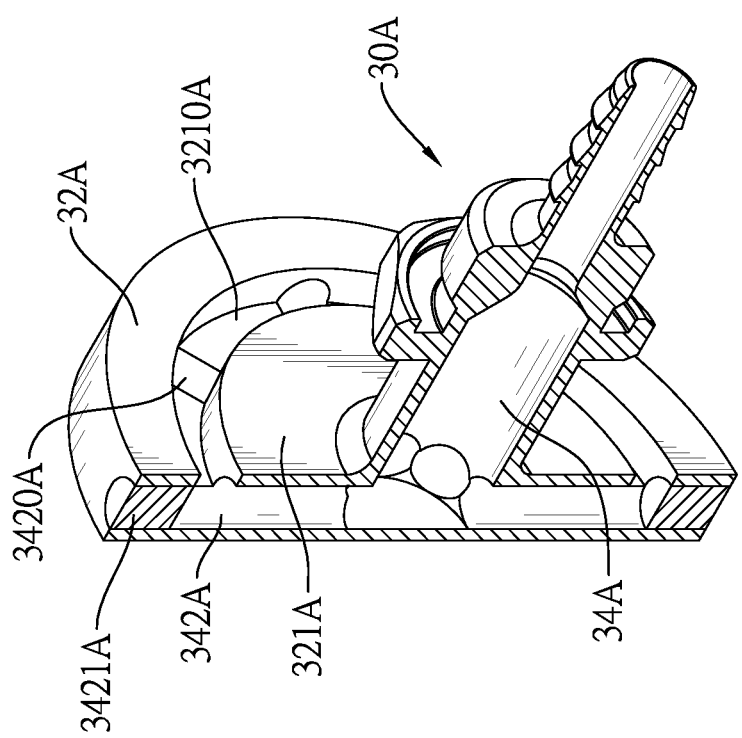
FIG. 10 is a sectional perspective view of an inlet component of the reserve tank in FIG. 9.

Please refer to FIGS. 9 and 10. A second embodiment of the present invention is provided. The reserve tank of the second embodiment is similar to the reserve tank of the first embodiment, but one of the differences is that the branch portion 32A of the inlet component 30A comprises an annular groove 3210A. The annular groove 3210A is formed on the first surface 321A of the branch portion 32A, and said first surface 321A is the surface that faces the plain surface 12 of the container 10 on which the inlet component 30A is mounted. The groove 3210A communicates with the branch tunnels 342A, and thus the branch openings 3420A are formed between the branch tunnels 342A and the annular groove 3210A.

Another difference is that an outer end of each one of the branch tunnels 342A is blocked by a block 3421A.

Therefore, the bubbles in the inlet channel 34A may move upward along the branch tunnels 342A and then move toward the plain surface 12 of the container 10 on which the inlet component 30A is mounted. In other words, the bubbles move away from the exhaust opening 241, so that the bubbles may not be drawn in the outlet channel 24 no matter at what angle the reserve tank is disposed.

Figure 11:
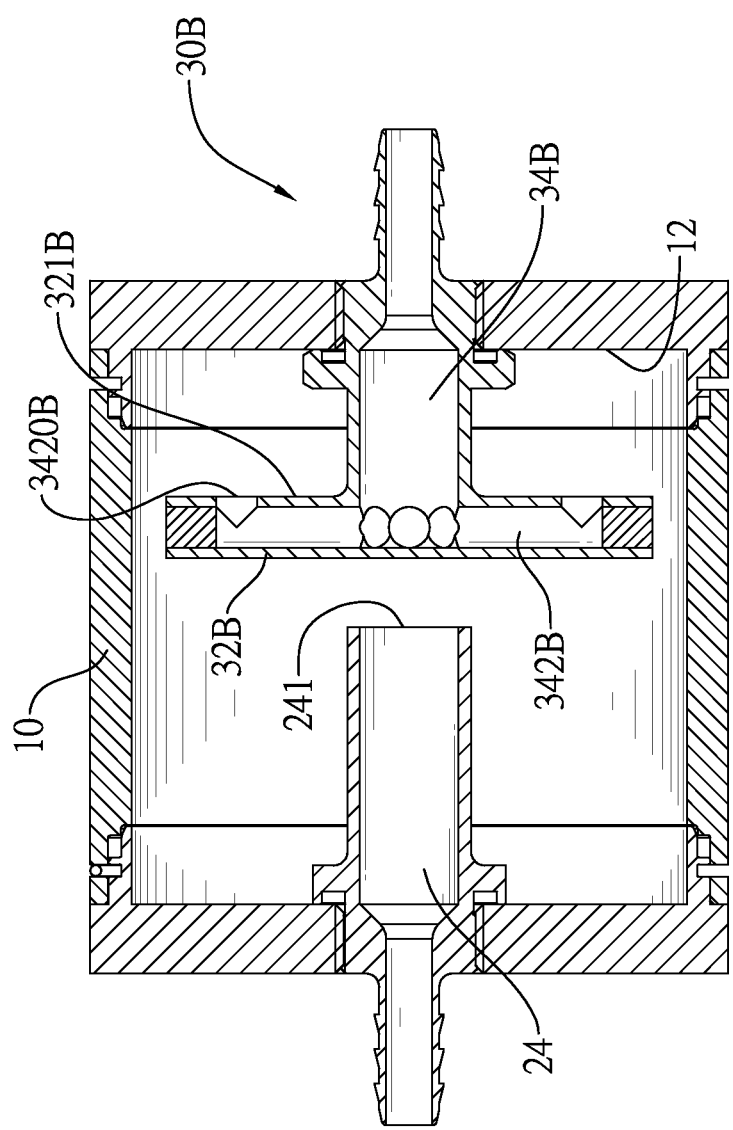
FIG. 11 is a sectional view of the reserve tank in accordance with a third embodiment of the present invention.
Figure 12:
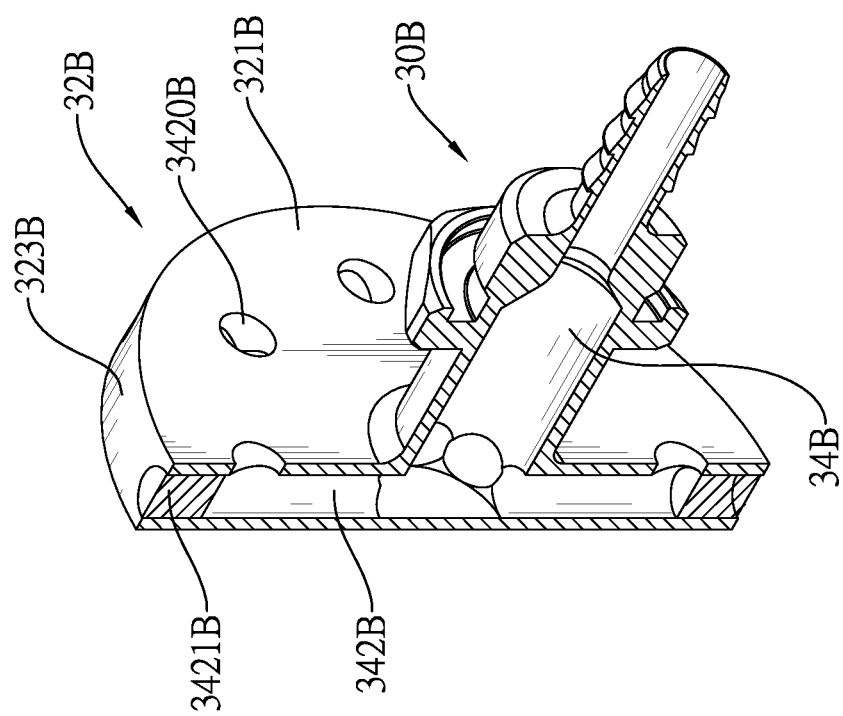
FIG. 12 is a sectional perspective view of an inlet component of the reserve tank in FIG. 11.

Please refer to FIGS. 11 and 12. A third embodiment of the present invention is provided. The reserve tank of the third embodiment is similar to the reserve tank of the first embodiment, but one of the differences is the branch openings 3420B are formed on the first surface 321B of the branch portion 32B rather than the side surface 323B of the branch portion 32B, said first surface 321B is the surface that faces the plain surface 12 of the container 10 on which the inlet component 30B is mounted.

Another difference is that an outer end of each one of the branch tunnels 342B is blocked by a block 3421B.

Therefore, the bubbles in the inlet channel 34B may move upward along the branch tunnels 342B and then move toward the plain surface 12 of the container 10 on which the inlet component 30B is mounted. In other words, the bubbles move away from the exhaust opening 241, so that the bubbles may not be drawn in the outlet channel 24 no matter at what angle the reserve tank is disposed.

Figure 13:
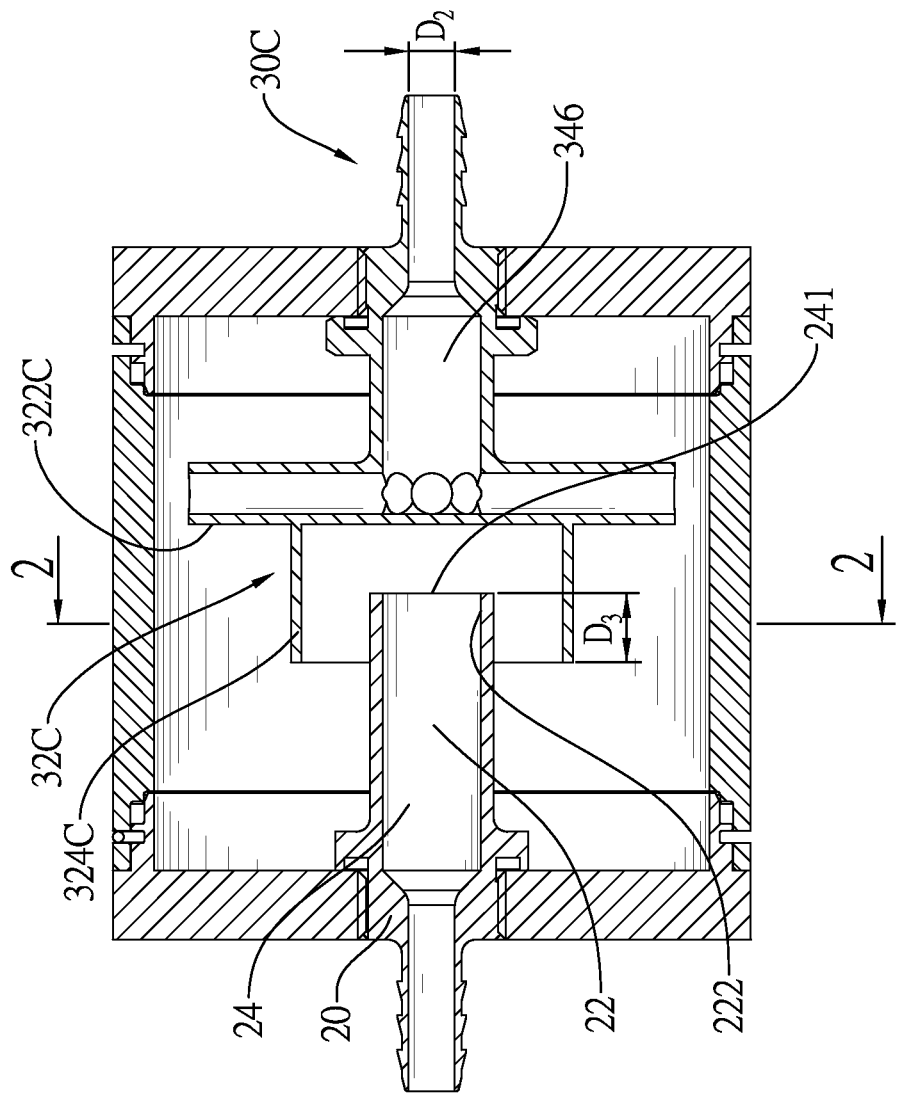
FIG. 13 is a sectional view of the reserve tank in accordance with a fourth embodiment of the present invention.
Figure 14:
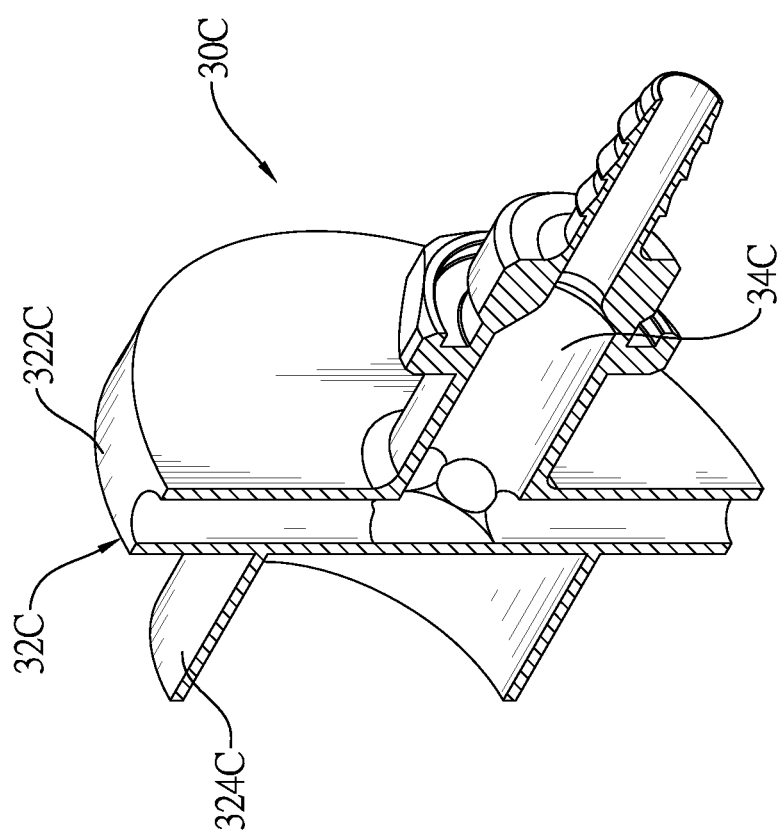
FIG. 14 is a sectional perspective view of an inlet component of the reserve tank in FIG. 13.
Figure 15:
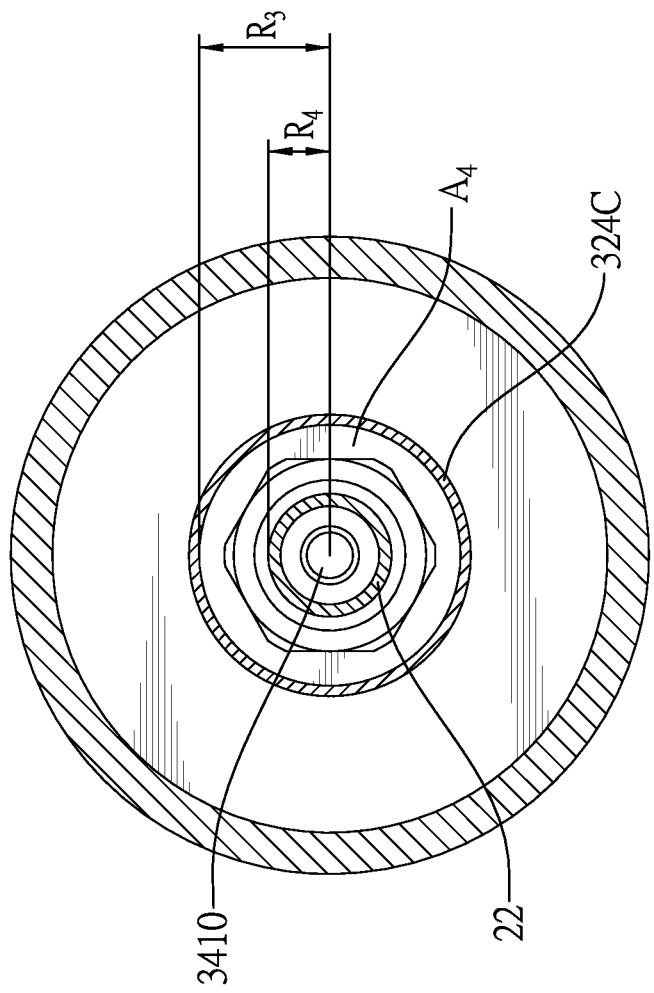
FIG. 15 is another sectional view of the reserve tank across line 15-15 in FIG. 13.

Please refer to FIGS. 13 to 15. A fourth embodiment of the present invention is provided. The reserve tank of the fourth embodiment is similar to any of the reserve tanks of the first, the second, and the third embodiments, but one of the differences is that the inlet component 30C comprises a shield 324C. The shield 324C is mounted on the second surface 322C of the branch portion 32C, and said second surface 322C is the surface that faces the outlet component 20. The shield 324C is annular in shape and around the open end 222 of the extending portion 22 of the outlet component 20. In other words, the exhaust opening 241 of the outlet channel 24 on the open end 222 is accommodated in the shield 324C.

Therefore, the bubbles moving out of the inlet channel 34C may be blocked by the shield 324C, so that the bubbles may not be drawn in the outlet channel 24 no matter at what angle the reserve tank is disposed.

Besides, to reduce the resistances of the circulation of the working liquid, another projected area (which is projected on the imaginary plane that is perpendicular to the axis of the container 10) is defined between the shield 324C and the extending portion 22 of the outlet component 20. An area of said another projected area is $A_4$, and $A_4$ should not be less than $A_1$ (i.e. $A_4 \geq A_1$). Precisely, an inner radius of the shield 324C is $R_3$, an outer radius of the extending portion 22 is $R_4$, and thus the projected area $A_4$ is equal to $\pi R_3^2 - \pi R_4^2$ (i.e. $A_4 = \pi R_3^2 - \pi R_4^2$). In addition, a distance, $D_3$, between the open end 222 of the extending portion 22 and an outer edge of the shield 324C should be greater than $D_2$, the diameter of the inlet opening 3410 of the inlet opening 3410 (i.e. $D_3 \geq D_2$).

Please refer to FIG. 15. A fifth embodiment of the present invention is provided. The reserve tank of the fifth embodiment is similar to any of the reserve tanks of the first, the second, third and the fourth embodiments, but one of the differences is that the reserve tank further comprises a filter 50D. The filter 50D may be mounted in the outlet channel 24 of the outlet component 20, in the inlet channel 34 of the inlet component 30, on an outer end of the outlet connecting portion 23 of the outlet component 20, or on an outer end of the inlet connecting portion 33 of the inlet component 30. For example, as shown in FIG. 15, the filter 50D is mounted in the inlet channel 34. Precisely, in this embodiment, the filter 50D fills part of the main tunnel 341 and all the branch tunnels 342 of the inlet channel 34. The filter 50D may be made from sponge or activated carbon, but it is not limited thereto.

Figure 16:
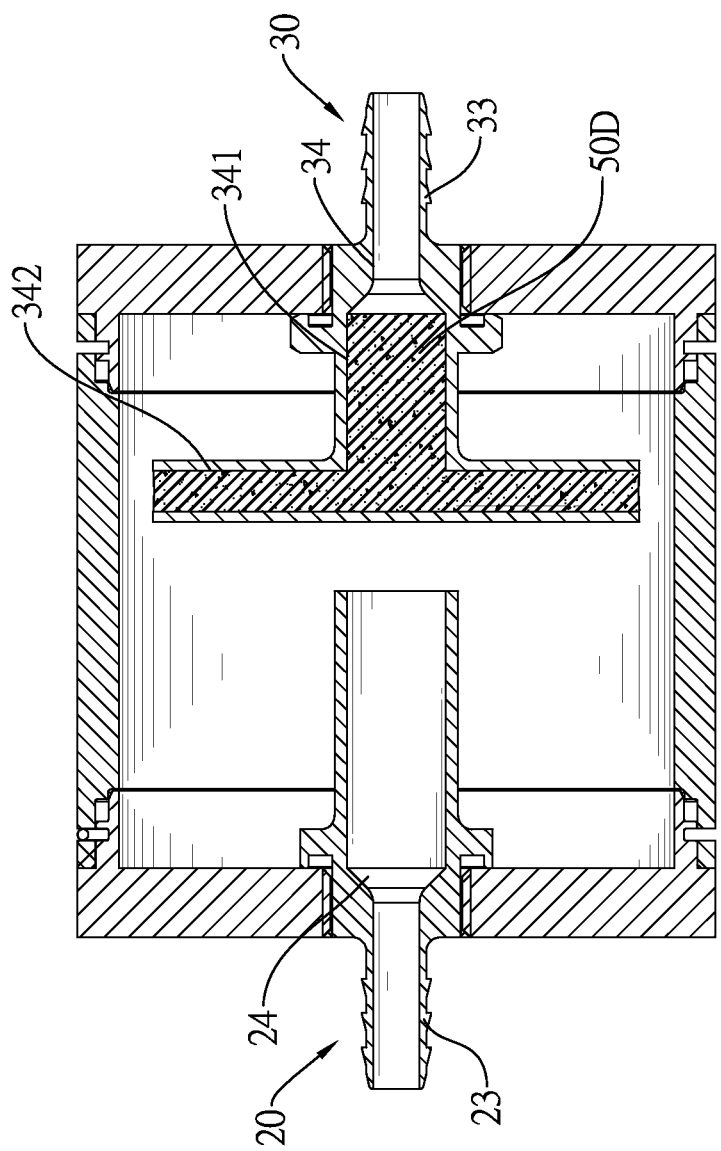
FIG. 16 is a sectional view of the reserve tank in accordance with a fifth embodiment of the present invention.
Figure 17:
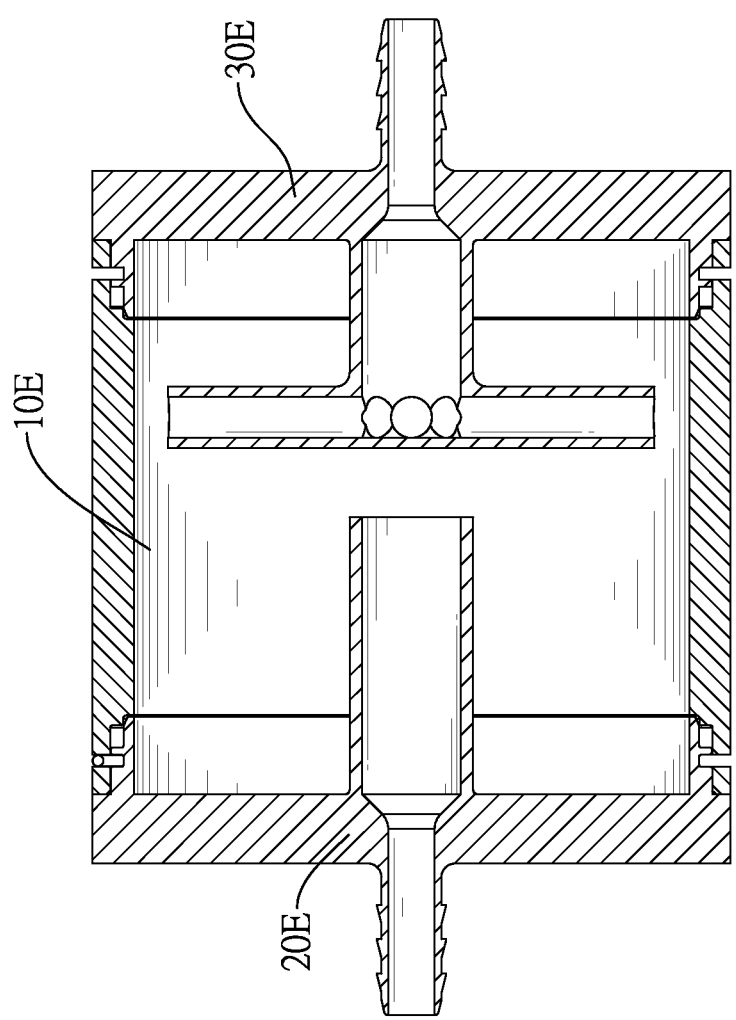
FIG. 17 is a sectional view of the reserve tank in accordance with a sixth embodiment of the present invention.

Please refer to FIG. 16. A sixth embodiment of the present invention is provided. The reserve tank of the sixth embodiment is similar to any of the reserve tanks of the first, the second, the third, the fourth, and the fifth embodiments, but one of the differences is that the container 10E itself is hollow and does not comprise any lid, and instead, the outlet component 20E and the inlet component 30E form plane surfaces and the plane surface close two ends of the container 10E. In other words, for example, the outlet component 20 and one of the lids 102 in the first embodiment are formed integrally as the outlet component 20E in the sixth embodiment, and the inlet component 30 and the other the lid 102 in the first embodiment are formed integrally as the inlet component 30E in the sixth embodiment. Therefore, intervals or gaps formed between two connected components are reduced so that the liquid is hard to evaporate and the air is hard to enter the reserve tank.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A reserve tank for containing a working liquid, the reserve tank comprising:
   a container forming:
      two openings; and
      an inner space for containing the working liquid;
   an outlet component mounted through one of the two openings of the container; the outlet component comprising:
      an outlet fixing portion mounted in said one of the two openings;
      an extending portion located in the container and comprising:
         a fixing end mounted on one side of the outlet fixing portion; and
         an open end located at a center of the container;
      an outlet connecting portion mounted on another side of the outlet fixing portion and located out of the container;
      an outlet channel formed through the outlet fixing portion, the extending portion, and the outlet connecting portion, and communicating with the inner space of the container;
   an inlet component mounted through the other one of the two openings of the container; the inlet component comprising:
      an inlet fixing portion mounted on said the other one of the two openings;
      a branch portion mounted on one side of the inlet fixing portion and located in the container;
      an inlet connecting portion mounted on another side of the inlet fixing portion and located out of the container;
      an inlet channel comprising:
         a main tunnel formed through the inlet connecting portion and the inlet fixing portion, and in the branch portion;
         a plurality of branch tunnels formed in the branch portion; one end of each one of the branch tunnels connected to and communicating with the main tunnel and another end of each one of the branch tunnels communicating with the inner space of the container, and the branch tunnels extending outward from the main tunnel and arranged radially.

2. The reserve tank as claimed in claim 1 further comprising a filter mounted in the outlet channel of the outlet component or in the inlet channel of the inlet component.

3. The reserve tank as claimed in claim 1, wherein:
   the main tunnel includes:
      an inlet opening formed at an outer end of the inlet connecting portion; and
   each one of the branch tunnels includes:
      a branch opening formed at an outer end of the branch tunnel;
   wherein a summation of areas of the branch openings is larger than or equal to an area of the inlet opening.

4. The reserve tank as claimed in claim 2, wherein:
   the main tunnel includes:
      an inlet opening formed at an outer end of the inlet connecting portion; and
   each one of the branch tunnels includes:
      a branch opening formed at an outer end of the branch tunnel;

wherein a summation of areas of the branch openings is larger than or equal to an area of the inlet opening.

5. The reserve tank as claimed in claim 1, wherein the inlet component further comprises:
a shield mounted on the branch portion and extending from the branch portion toward the outlet component; the shield being annular in shape and around the open end of the extending portion of the outlet component.

6. The reserve tank as claimed in claim 4, wherein the inlet component further comprises:
a shield mounted on the branch portion and extending from the branch portion toward the outlet component; the shield being annular in shape and around the open end of the extending portion of the outlet component.

7. The reserve tank as claimed in claim 5, wherein the main tunnel includes:
an inlet opening formed at an outer end of the inlet connecting portion;
wherein a projected area is projected on an imaginary plane that is perpendicular to an axis of the container, the projected area is defined between the shield and the extending portion of the outlet component, and an area of the projected area is larger than or equal to an area of the inlet opening.

8. The reserve tank as claimed in claim 6, wherein a projected area is projected on an imaginary plane that is perpendicular to an axis of the container, the projected area is defined between the shield and the extending portion of the outlet component, and an area of the projected area is larger than or equal to an area of the inlet opening.

9. The reserve tank as claimed in claim 1, wherein the branch portion comprises:
a trunk mounted on the inlet fixing portion; and
a plurality of branches; one end of each one of the branches mounted on the trunk, and the branches extending outward from the trunk and arranged radially;
wherein the main tunnel is formed in the trunk, and the branch tunnels are formed through the branches respectively.

10. The reserve tank as claimed in claim 8, wherein the branch portion comprises:
a trunk mounted on the inlet fixing portion; and
a plurality of branches; one end of each one of the branches mounted on the trunk, and the branches extending outward from the trunk and arranged radially;
wherein the main tunnel is formed in the trunk, and the branch tunnels are formed through the branches respectively.

11. The reserve tank as claimed in claim 1, wherein:
the branch portion comprises:
a round disk body including:
a first surface;
a second surface opposite the first surface and facing the outlet component; and
a side surface between the first surface and the second surface; and
the branch tunnels are formed in the round disk body.

12. The reserve tank as claimed in claim 8, wherein:
the branch portion comprises:
a round disk body including:
a first surface;
a second surface opposite the first surface and facing the outlet component; and
a side surface between the first surface and the second surface; and
the branch tunnels are formed in the round disk body.

13. The reserve tank as claimed in claim 11, wherein each one of the branch tunnels includes:
a branch opening formed on the side surface of the round disk body of the branch portion.

14. The reserve tank as claimed in claim 12, wherein the branch openings are formed on the side surface of the round disk body of the branch portion.

15. The reserve tank as claimed in claim 11, wherein each one of the branch tunnels includes:
a branch opening formed on the first surface of the round disk body of the branch portion.

16. The reserve tank as claimed in claim 12, wherein the branch openings are formed on the first surface of the branch portion.

17. The reserve tank as claimed in claim 11, wherein the round disk body of the branch portion further includes:
an annular groove formed on the first surface and communicating with the branch tunnels.

18. The reserve tank as claimed in claim 12, wherein the round disk body of the branch portion further includes:
an annular groove formed on the first surface and communicating with the branch tunnels, and the branch openings formed between the annular groove and the branch tunnels.

19. The reserve tank as claimed in claim 11, wherein the main tunnel includes:
an inlet opening formed at an outer end of the inlet connecting portion;
wherein a projected area is projected on an imaginary plane that is perpendicular to an axis of the container, the projected area is defined between an inner side surface of the container and the round disk body of the branch portion, and an area of the projected area is larger than or equal to an area of the inlet opening.

20. The reserve tank as claimed in claim 12, wherein another projected area is projected on an imaginary plane that is perpendicular to the axis of the container, said another projected area is defined between an inner side surface of the container and the round disk body of the branch portion, and an area of said another projected area is larger than or equal to an area of the inlet opening.

* * * * *